United States Patent [19]

Bode

[11] 4,130,382

[45] Dec. 19, 1978

[54] CONTROL SYSTEM FOR IRRIGATION PUMPS

[76] Inventor: John J. Bode, Box 865, Hastings, Nebr. 68901

[21] Appl. No.: 758,012

[22] Filed: Jan. 10, 1977

[51] Int. Cl.² .............................................. F04B 49/06
[52] U.S. Cl. .................................... 417/12; 137/78; 137/392; 417/33; 417/34; 417/36
[58] Field of Search .................. 417/10, 12, 33, 34, 417/36–38, 40; 137/78, 392; 73/304 R, 304 C

[56] References Cited

U.S. PATENT DOCUMENTS

| | | | |
|---|---|---|---|
| 1,570,784 | 1/1926 | Schmidt | 417/33 |
| 2,550,093 | 4/1951 | Smith | 417/33 X |
| 2,741,986 | 4/1956 | Smith | 417/12 X |
| 3,118,606 | 1/1964 | Rotunda | 137/78 |
| 3,140,720 | 7/1964 | Griswold | 137/78 X |
| 3,223,041 | 12/1965 | Quinn | 417/36 X |
| 3,282,217 | 11/1966 | Slover et al. | 137/392 |
| 3,361,356 | 1/1968 | Johnson et al. | 137/78 X |
| 3,500,844 | 3/1970 | Sanner | 137/78 |
| 3,598,144 | 8/1971 | Hodgson | 137/392 |

Primary Examiner—Carlton R. Croyle
Assistant Examiner—Edward Look
Attorney, Agent, or Firm—Lowe, Kokjer, Kircher, Wharton & Bowman

[57] ABSTRACT

A rain activated control system which shuts off an irrigation pump when a predetermined amount of rainfall occurs. A receptacle for catching rain is mounted in a manner to provide adjustment of the distance between its bottom and a pair of electrodes which extend into the receptacle. When rain is collected in the receptacle in sufficient quantity to immerse the electrodes, a control circuit is completed to operate a relay. The energized relay then activates the shut down system of the engine or motor which drives the irrigation pump. Ater a time delay sufficient to assure complete shut down of the pump, a timing circuit causes deenergization of the relay and closes a reset circuit. When the irrigation pump is to be restarted, the rain receptacle is emptied and a reset switch is opened to reset the control circuitry.

5 Claims, 5 Drawing Figures

CONTROL SYSTEM FOR IRRIGATION PUMPS

BACKGROUND AND SUMMARY OF THE INVENTION

This invention relates generally to irrigation and more specifically to a system for controlling the operation of an irrigation pump.

Irrigation pumps which draw water from a well for irrigation are usually turned on and off manually. This is not entirely satisfactory because the pump is located at the well site, which is usually at a remote location. In the event of heavy rainfall, the farmer who is irrigating his crops must go to the pump location, often at an inconvenient time, and shut down the engine or motor which powers the irrigation pump. Otherwise, the excessive water which is applied to the field will run off, resulting in waste of water and erosion of the soil. Excessive power is also consumed if the pump continues to operate needlessly during a heavy rain.

Although there have been automatic systems developed to turn off irrigation equipment during periods of heavy rainfall, these systems have been less than satisfactory in a number of respects. Typically, a lever mounted rain receptacle is provided, as exemplified by the patents to Heinrich U.S. Pat. No. 3,309,474, and Caldwell U.S. Pat. No. 3,448,689. When sufficient rain is collected in the receptacle, its weight causes the lever to pivot in a manner to trip a switch which shuts down the irrigation system. The patent to Haggard U.S. Pat. No. 3,333,072 relates to a similar arrangement in which a spring mounted receptacle receives rain. When the weight of the water in the receptacle is great enough, the spring force is overcome and a switch is tripped to shut off the irrigation system.

All of these patented units require a mechanical linkage such as a lever or spring, and all of the usual mechanical problems are thus encountered. Moreover, forces other than rain can inadvertently trip the shut-off mechanism. For example, if high winds are encountered or if a bird should land on the rain receptacle, the lever arm or spring assembly would move in a manner to shut down the irrigation equipment, possibly at an inopportune time.

Other types of rain activated shut off devices suffer from the foregoing disadvantages as well as additional drawbacks. Switches which are highly sensitive to moisture are undesirable because light rain and even high humidity conditions can cause them to shut down the irrigation system. Furthermore, switches of this type are not adjustable as to the amount of rainfall that is required to shut off the irrigation pump.

It is an important object of the present invention to provide a control system which controls the operation of an irrigation pump in accordance with the need for irrigation.

More specifically, it is an object of the invention to provide a control system which automatically shuts off the irrigation pump when a predetermined quantity of rain has fallen.

Another object of the invention is to provide a control system which may be easily and accurately adjusted as to the amount of rain necessary to effect shut down of the irrigation pump.

Still another object of the invention is to provide a control system which is adapted to be used with irrigation pumps that are powered either by internal combustion engines or electric motors.

A further object of the invention is to provide, in a system of the character described, a control circuit which maintains the shutoff system of the pump activated for a sufficient time to assure that the pump is completely shut off.

An additional object of the invention is to provide, in a control system of the character described, means for resetting the control circuitry when the irrigation pump is to be restarted.

Yet another object of the invention is to provide a control system of the character described which is constructed simply and economically, and which operates reliably.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views.

Figure 1:
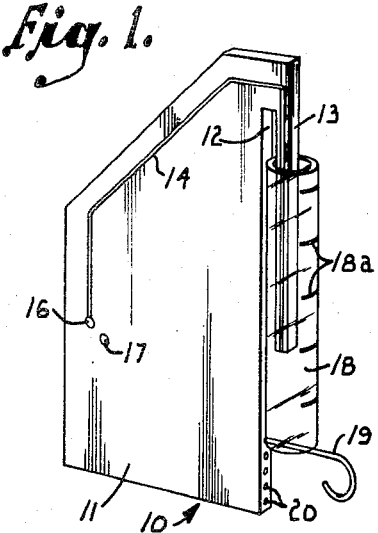
FIG. 1 is a perspective view of a rain gauge device which is constructed for use in accordance with the present invention.
Figure 2:
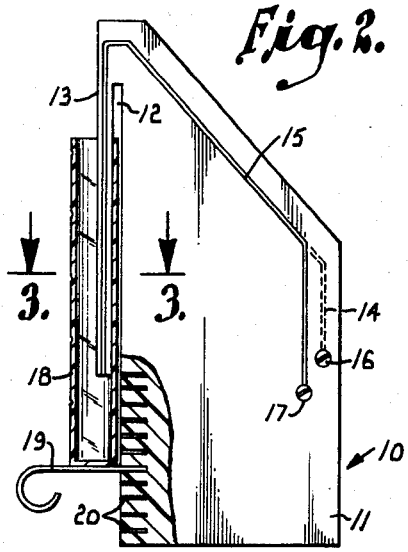
FIG. 2 is a side elevational view showing the side of the device opposite the side which is visible in FIG. 1, with portions shown in cross section.
Figure 3:
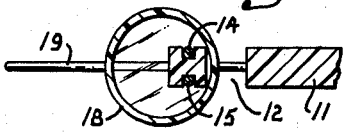
FIG. 3 is a fragmentary sectional view on an enlarged scale taken generally along line 3—3 of FIG. 2 in the direction of the arrows.

With initial reference to FIGS. 1–3, reference numeral 10 generally designates a rain gauge device which essentially measures the amount of rainfall in order to control the operation of an irrigation pump (not shown) in accordance therewith. The gauge device 10 is supported on a frame in the form of a flat plate 11 which is preferably constructed of a sturdy plastic or another substance that will not be damaged substantially when exposed to moisture.

A vertical slot 12 is formed in plate 11 near one side edge to provide a rod-like frame member 13 which extends downwardly from near the top of the plate. A pair of electrically conducting electrode wires 14 and 15 are secured in any suitable manner to extend along opposite sides of member 13. Wires 14 and 15 also extend along opposite sides of plate 11 and are preferably recessed within grooves formed in member 13 and plate 11, as best shown in FIG. 3. A pair of screws 16 and 17 are screwed into plate 11 to provide terminals which connect with the respective wires 14 and 15.

An open topped tube 18 is used to catch rain. The tube is supported on top of a mounting bracket 19 which is in turn adjustably supported on plate 11. A series of small bores 20 are formed in the side edge of plate 11 at vertically spaced locations below the bottom end of member 13. Bracket 19 has a rod-like end portion which is able to closely fit in each of the bores 20 in order to connect the bracket with plate 11 at various elevations. Tube 18 has a solid bottom which rests on top of bracket 19 with one side of the tube fitting within the slot 12. Member 13 and the electrodes 14 and 15 extend down into the open top of the tube and are spaced above its bottom surface, as shown in FIGS. 1 and 2.

Figure 4:
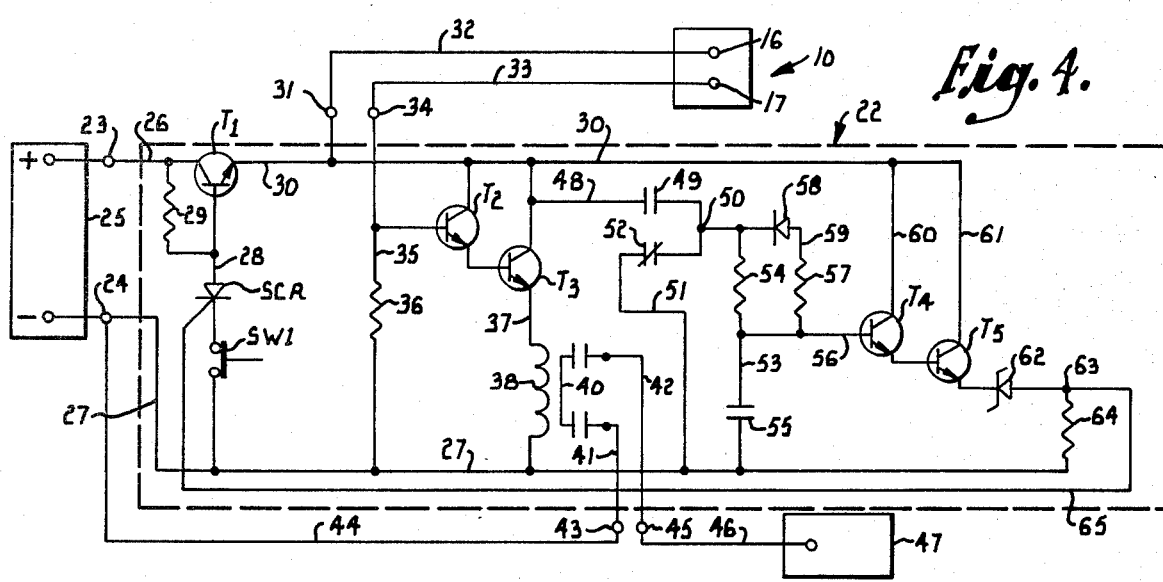
FIG. 4 is a schematic diagram of a control circuit which is used to control the operation of an internal combustion engine.

The adjustable mounting of bracket 19 permits the distance of electrodes 14 and 15 above the bottom of tube 18 to be varied in order to vary the amount of rainfall necessary to fill the tube sufficiently to reach the level of the electrodes. The tube is preferably provided with a series of calibration marks 18a which indicate the distance of the electrodes above the bottom surface of the tube. Bores 20 are spaced at one fourth inch increments in the preferred embodiment, although they may be spaced in any desired manner. FIG. 4 illustrates a control circuit which controls the operation of an internal combustion engine (not shown) which drives the irrigation pump. The circuitry is housed within an enclosed, weatherproof control box which is indicated in broken lines and designated by numeral 22. The circuit has terminals 23 and 24 which may be connected with the respective positive and negative terminals of a battery 25. The battery is preferably the 12 volt DC storage battery of the internal combustion engine, although any other suitable power source may be used.

The control circuitry includes conductors 26 and 27 which lead from terminals 23 and 24, respectively. Conductor 26 connects with a transistor T1 which has another conductor 28 connected with its base. A resistor 29 is tied between the conductors 26 and 28. A silicon controlled rectifier SCR is provided in line 28, which leads to connection with line 27 through a normally closed reset switch SW1. Switch SW1 may be located on control box 22, and it is preferably a push button switch which may be opened manually.

A conductor 30 leads from the emitter of transistor T1 and is provided with a terminal 31 to which a conductor line 32 leading from screw 16 may be connected. Another conductor line 33 connects with screw 17 and may be connected with another terminal 34 of the control circuit. A conductor 35 leads from terminal 34 to connection with line 27 through a resistor 36.

A transistor T2 has its base connected with line 35 and its collector connected with line 30. The emitter of transistor T2 is connected with the base of another transistor T3 which is connected in a conductor 37 that extends between lines 30 and 27. Line 37 includes a relay coil 38.

Included in the relay circuit which coil 38 controls is a normally open relay contact 40 which, when closed, establishes connection between a pair of conductors 41 and 42. Conductor 41 has a terminal 43 for connection with a conductor line 44 that extends from the negative terminal of battery 25. Conductor 42 has a terminal 45 for connection with a conductor line 46 that leads to a shutoff system 47 of the internal combustion engine which powers the irrigation pump.

While the shutoff system 47 may be any suitable mechanism which acts to shut off the engine, it is preferably of the type commonly known as the Murphy Safety System. Systems of this type are often used with internal combustion engines which drive irrigation pumps, and they serve to protect the engine by shutting it off if the oil pressure or oil level is too low, or if the coolant temperature is too high. The Murphy Safety System 47 is connected with ground so that it activates the stop solenoid to shut off the engine when line 46 is connected with the negative battery terminal.

A timing circuit includes a conductor 48 which connects with line 37 on the collector side of transistor T3. Conductor 48 is provided with a capacitor 49, and it leads to a node 50 from which another conductor 51 extends. Conductor 51 connects with line 27 and is provided with a variable capacitor 52. Another conductor 53 leads from node 50 to connection with line 27. Conductor 53 is provided with a resistor 54 and a capacitor 55, between which is connected a line 56 that leads to the base of a transistor T4. A resistor 57 and diode 58 are located in a line 59 which connects with line 56 and with line 53 at a location between node 50 and resistor 54.

Transistor T4 is located in a line 60 which extends between line 30 and the base of another transistor T5. Also leading from line 30 is a conductor 61 which connects with transistor T5 and also with a diode 62. Line 61 terminates at a node 63 to which line 27 also connects through a resistor 64. A conductor 65 extends between nodes 63 and the gate of the SCR.

In use, plate 11 is mounted in a manner to orient tube 18 in an upright position so that it will receive any rainfall that occurs. Bracket 19 is set such that the bottom of tube 18 is located the desired distance below the lower ends of electrodes 14 and 15. For example, if it is desired for the irrigation pump to shut off after 2 inches of rain has fallen, bracket 19 is inserted in the bore 20 located 2 inches below member 13. It will thus take 2 inches of rainfall in order to immerse the electrodes in the water which is collected in tube 18.

Transistor T1 is biased to normally conduct, while the remaining transistors and the SCR are normally nonconductive so that the control circuit is open. However, when sufficient rain has fallen to reach the level of electrodes 14 and 15, the screws 16 and 17 are electrically connected through the electrodes and the water in the tube. This completes a circuit path from the positive terminal of battery 25 through conductor 26, transistor T1, conductors 30, 32, 33, and 35, resistor 36, and conductor 27 to the negative battery terminal. Completion of this circuit results in transistors T2 and T3 changing to the conductive state, and the relay coil 38 is thus energized. The relay contact 40 is then closed to connect conductors 41 and 42 with one another. This connects the Murphy Safety System 47 with the negative battery terminal through conductors 44 and 41, contact 40, and conductors 42 and 46. As a result, a circuit is completed through system 47 from the negative battery terminal to ground, and the shutoff system 47 shuts off the internal combustion engine and stops operation of the irrigation pump.

Relay coil 38 remains energized for a preselected time interval as set by the variable capacitor 52, after which the timing circuit causes it to deenergize. Once the rain activated switch mechanism closes and transistor T3 becomes conductive, the voltage applied to line 37 is also applied to the timing circuit such that the capacitors begin to discharge. After elapse of a time interval that may be varied by adjusting capacitor 52, the capacitors are discharged sufficiently that the high potential on line 56 causes transistor T4 to become conductive. This in turn causes transistor T5 to become conductive and results in a voltage drop across resistor 64, causing the SCR to fire.

When the SCR fires, transistor T1 changes to the nonconductive state, and all of the circuitry is disconnected from power except for the circuit extending from the positive battery terminal through conductor 26, resistor 29, line 28, the SCR, switch SW1, and conductor 27 to the negative battery terminal. This circuit draws much less power than the remainder of the control circuit, and as long as it remains closed, the engine remains off and the irrigation pump is idle. When the pump is to be restarted, the water is emptied from tube 18 and the reset switch SW1 is opened. The SCR is thereby switched off, and the circuitry is reset to its initial state wherein it again acts to shut off the irrigation pump if rain should fall in sufficient quantity. If the reset switch SW1 is depressed without emptying tube 18 of water, any attempt to start the irrigation pump will result in its being immediately shut off by the control circuitry and the safety system 47. Consequently, the tube must be emptied before the circuit can be reset.

The delay circuit maintains relay coil 38 energized for a sufficient time to assure that the safety system 47 is able to completely shut off the engine. With a Murphy Safety System, capacitor 52 is preferably set such that the timing curcuit will maintain the coil 38 energized for approximately 30 seconds before firing of the SCR causes it to deenergize.

Figure 5:
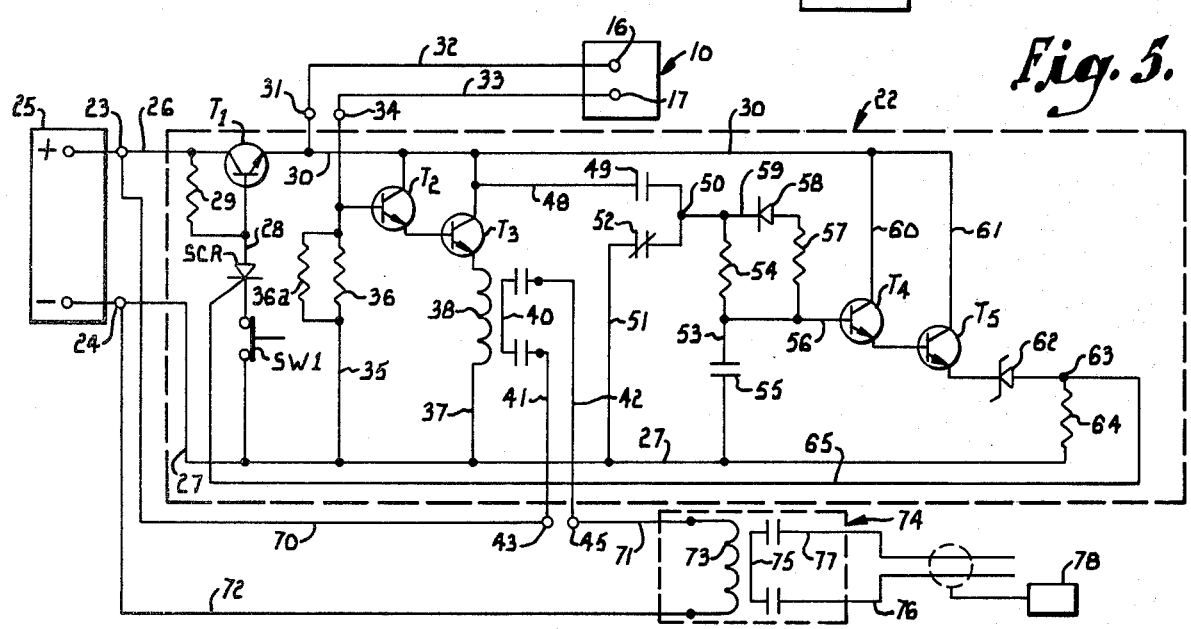
FIG. 5 is a schematic circuit diagram similar to FIG. 4, but showing a slightly modified circuit which is used to control the operation of an electric motor.

The control circuit shown in FIG. 5 is used with the rain gauge device 10 to control an irrigation pump which is driven by an electric motor (not shown). It is therefore modified slightly from the circuit of FIG. 4, although for the most part the two circuits are identical. As a minor change, a resistor 36a is connected in parallel with resistor 36.

The major change is in the relay circuit which includes the relay contact 40 and the conductors 41 and 42 described previously. As shown in FIG. 5, a conductor 70 is added to extend between terminals 23 and 43. Conductors 71 and 72 which lead from the opposite ends of a relay coil 73 are connected with terminals 45 and 24, respectively. Coil 73 is included in a relay 74 which is associated with the electric motor (not shown) that drives the irrigation pump.

The contact 75 of relay 74 is normally closed to connect a pair of conductors 76 and 77 with one another. These conductors 76 and 77 lead to a stop switch 78 which controls the conventional holding coil (not shown) of the magnetic starter of the electric motor. When contact 75 is opened to break the connection between conductors 76 and 77, the stop switch 78 deenergizes the holding coil and thereby shuts off the electric motor.

After a preselected time delay as established by the setting of the variable capacitor 52, the timing circuit causes the SCR to fire as previously related. The SCR thereafter remains in the conducting state and the irrigation pump remains off until the reset switch SW1 is opened to reset the control circuitry. The time delay between energization of the coil 38 and its deenergization, as caused by firing of the SCR, is preferably about 2 or 3 seconds since this time interval is adequate to assure that the stop switch 78 will be able to deenergize the holding coil of the magnetic starter in order to completely shut off the electric motor.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. Apparatus for controlling the operation of an irrigation pump having a shut-off system operable to deactivate the pump, said apparatus comprising:
    a normally open first circuit adapted to be connected with a power source;
    a rain sensitive switch mechanism operable to effect closing of said first circuit when rainfall occurs;
    control means associated with said first circuit and operable upon closing of same to activate said shut-off system, thereby deactivating the irrigation pump in response to closing of said first circuit by said switch mechanism;
    delay means for opening said first circuit after elapse of a preselected time period following closing of same;
    a normally open second circuit adapted to be connected with a power source and arranged in a manner to close after elapse of said time period following closing of said first circuit;
    means maintaining said first circuit open when said second circuit is closed; and
    a reset switch for opening said second circuit.

2. Apparatus as set forth in claim 1, including means for adjusting the length of said time period.

3. Apparatus as set forth in claim 1, wherein said control means includes:
    a normally open relay circuit adapted to be connected with a power source and operable when closed to activate said shut-off system; and
    a relay energized in response to closing of the first mentioned circuit and operable when energized to effect closing of said relay circuit, said delay means effecting deenergization of said relay after elapse of said time period following energization of same.

4. In a system for controlling the operation of an irrigation pump, the combination of:
    a frame;
    a receptacle having an open top for receiving rain and presenting a bottom surface;
    a pair of spaced apart electrodes disposed in said receptacle with at least one electrode spaced above said bottom surface, whereby electrical connection is established between said electrodes when the water level in said receptacle reaches a height to contact both electrodes;
    a bracket for supporting said receptacle in an orientation to receive rain water;
    means for connecting said bracket with said frame at a plurality of elevations with respect to said one electrode, thereby varying the distance between said one electrode and the bottom surface of said receptacle; and
    control means operable to deactivate the irrigation pump in response to establishment of electrical connection between said electrodes.

5. A combination as set forth in claim 4, including a frame member projecting from the frame generally downwardly into said receptacle through the open top thereof, said electrodes being secured to said frame member and extending therewith into said receptacle.

* * * * *